United States Patent
Irons (10) Patent No.: US 11,555,609 B1
(45) Date of Patent: Jan. 17, 2023

(54) UNDER-COUNTER LIGHTING SYSTEM

(71) Applicant: Elemental LED, Inc., Reno, NV (US)

(72) Inventor: Travis Irons, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 17/643,636

(22) Filed: Dec. 10, 2021

(51) Int. Cl.
*F21V 33/00* (2006.01)
*F21V 8/00* (2006.01)

(52) U.S. Cl.
CPC .......... *F21V 33/006* (2013.01); *G02B 6/0021* (2013.01); *G02B 6/0035* (2013.01); *G02B 6/0088* (2013.01)

(58) Field of Classification Search
CPC ..... A47B 12/08; A47B 12/12; F21V 33/0024; F21V 33/006; G02B 6/0086; G02B 6/0088; G02B 6/0021
See application file for complete search history.

(56) References Cited

U.S. PATENT DOCUMENTS

| | | | |
|---|---|---|---|
| 8,092,034 B2 | 1/2012 | Zarian et al. | |
| 10,321,523 B2* | 6/2019 | Nam | A47B 13/12 |
| 2014/0328052 A1* | 11/2014 | Hochman | F21V 21/02 |
| | | | 362/147 |
| 2016/0320048 A1* | 11/2016 | Daniels | F21S 2/00 |
| 2018/0311935 A1* | 11/2018 | Sahyoun | B32B 17/10541 |

* cited by examiner

*Primary Examiner* — Keith G. Delahoussaye
(74) *Attorney, Agent, or Firm* — United IP Counselors, LLC (57) ABSTRACT

An under-counter lighting system places a light-guide panel (LGP) or a set of LGPs under a countertop, or another such work surface, in order to backlight it. Specifically, a base layer is secured to a support, such as a cabinet. The base layer includes a support layer and a number of support posts attached to the support layer. An LGP layer includes the LGP or LGPs. Each of the LGPs has openings that correspond to positions of the support posts, such that the LGPs receive the support posts through their thicknesses. A countertop is secured to the tops of the support posts and may have a depending lip or other such feature sufficient to hide the base layer and the LGP layer. The resulting light, usually at least partially transmitted through the countertop itself, can serve as ambient light, task light, or accent light, depending on the installation.

20 Claims, 7 Drawing Sheets

UNDER-COUNTER LIGHTING SYSTEM

TECHNICAL FIELD

The invention relates to lighting systems, and in particular to lighting systems for use under counters and under other horizontal surfaces.

BACKGROUND

As solid-state lighting based on light-emitting diodes has come to the fore in the last decade, it has become popular not only as a replacement for existing light sources, but as a novel source of general, task, and accent lighting. Because of its small size and variety of configurations, solid-state lighting can be placed where traditional incandescent and fluorescent light sources cannot.

Kitchens and bathrooms are among the more popular places where solid-state lighting is used for task and accent lighting. Strips of linear lighting, for example, may be used under cabinets, around mirrors, and in alcoves to provide accent lighting. In addition, light-guide panels (LGPs), large, illuminated panels driven by solid-state lighting, are increasingly being used to light countertops. In a typical installation, an LGP or several LGPs are placed below a countertop. The countertop itself may be made of a translucent material, such as onyx, quartz, or agate, such that light from the LGPs backlights and illuminates the countertop.

Procedures for installing LGPs under countertops are relatively undeveloped. In some cases, an installer may simply place a countertop over an LGP, allowing the countertop to "float" over the LGP without effective securement. While the weight of the countertop usually prevents casual movement, the countertop may still shift after installation, and there may be issues during earthquakes, and in other situations where the countertop is subjected to significant forces. However, installing a countertop on an LGP is not a trivial matter. For example, drilling into an LGP or inserting a fastener through the LGP may release light in an undesired location, destroying the diffuse light emission ordinarily created by the LGP and creating a "hot spot" of non-uniform illumination.

BRIEF SUMMARY

One aspect of the invention relates to an under-counter lighting system. The system places a light-guide panel (LGP) or a set of LGPs under a countertop, or another such work surface, in order to backlight it. The resulting light, usually at least partially transmitted through the countertop itself, can serve as ambient light, task light, or accent light, depending on the installation.

In the system, a base layer is secured to a cabinet or another type of support. The base layer includes a support layer, from which a number of support posts extend. An LGP layer includes one or more LGPs that have openings positioned to receive the support posts through the thicknesses of the LGPs. A countertop, or another type of work surface, is secured to the tops of the support posts, such that the LGP layer is interposed under the countertop. The support posts may be made of a light-transmissive material that is similar to, or the same as, the material of the LGPs. They may also have a reflective coating on their bottoms, such that the support posts transmit light through the LGPs. In one embodiment, the support posts may be hollow cylinders. If the indirect light provided by the LGP layer is insufficient to backlight the countertop in a specific application, the LGP layer may have a border of light-emitting elements that emit light directly upward, into the countertop.

With this system, the countertop can be fully supported and secured in place, while the LGP layer provides a variety of options for countertop illumination. Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
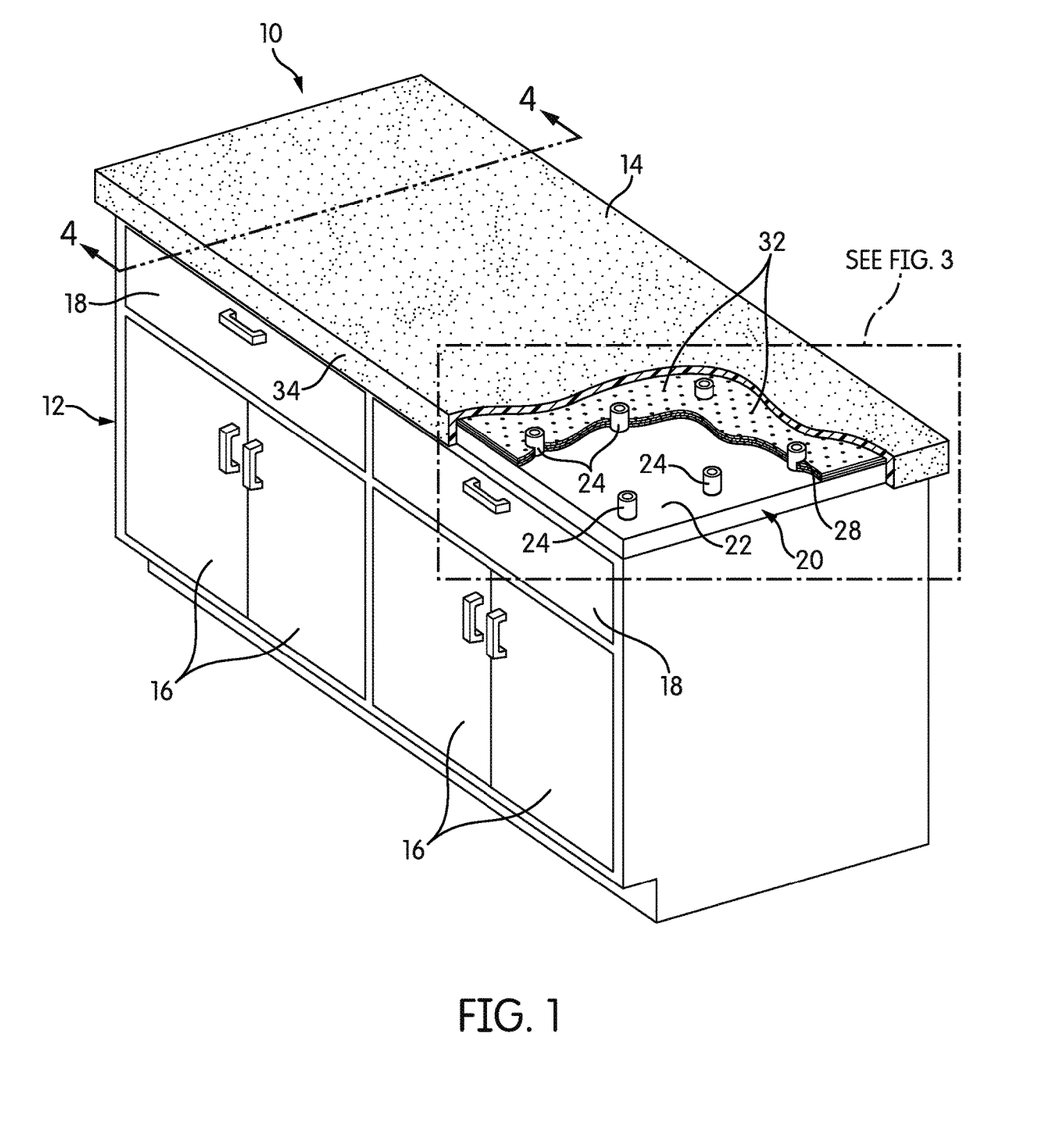
FIG. 1 is a partially cut-away perspective view of a cabinet with an under-counter lighting system according to one embodiment of the invention.

FIG. 1 is a partially cut-away perspective view of an under-counter lighting system, generally indicated at 10, according to one embodiment of the invention. The under-counter lighting system 10 is shown installed on a cabinet 12. Using system 10, diffused light is produced and transmitted through a countertop 14. The countertop 14 itself is at least partially light-transmissive and is thus backlit by system 10. This may provide ambient or task lighting to someone working on the countertop 14, or it may simply be used as accent lighting, or for ambience.

The cabinet 12 shown is of the type that might be found, e.g., in a residential kitchen or bathroom. However, as those of skill in the art will understand, the invention need not be limited to residential and commercial kitchens and bathrooms. Under-counter lighting systems like system 10 may be installed, e.g., as laboratory workbench surfaces, light tables, drafting tables, or any other, similar work surfaces that would benefit from being backlit. Thus, the term "countertop" should be read broadly to include a wide range of work surfaces. In the kitchen environment, the countertop 14 will often be a material such as onyx, quartz, or agate, but there are many other possibilities. For example, the countertop 14 could be made of a glass slab, such as a borosilicate glass slab, and may be etched, sandblasted, pigmented, etc., to at least partially hide the components below. In environments in which wear and environmental resistance are not important considerations, the countertop 14 could be made of poly(methyl methacrylate) (PMMA) or polycarbonate, to name but a few materials. Other possibilities for the countertop 14 include two-part resins, such as epoxies, that are poured into a mold. For example, the countertop 14 may be comprised of a resin with various colorants included therein, or it may be comprised of a combination of a resin and other materials, such as wood, with or without dyes or colorants.

Above, the term "at least partially light-transmissive" is used with the understanding that, if the luminous flux is great enough, almost any material is at least partially light-transmissive. The limitations in the material of the countertop 14 are thus more practical and situational than anything else—at some point, backlighting a more-opaque material will require so much light and generate so much heat that it will be undesirable. However, materials such as marble are not necessarily excluded as materials for the countertop 14.

The configuration of the cabinet 12 is not critical, and in at least some embodiments, there need be no cabinet 12; rather, only some kind of support base is needed. If there is no need for an internal storage volume, the support base may comprise nothing more than, e.g., a set of legs or a pedestal. The cabinet 12 has internal storage space with cabinet doors 16 and drawers 18 provided to access the internal space. In this embodiment, the cabinet 12 is rectangular in top plan view, although it may be L-shaped in top plan view or have any other shape.

A base layer 20 is attached to the cabinet 12 using typical fasteners—screws, nails, adhesive, etc. The base layer 20 includes a support surface 22 on which are installed a number of support posts 24. As will be described below in more detail, the purpose of the support surface 22 is to support the weight of the countertop 14 and anything placed on it. The support surface 22 supports the countertop 14 indirectly, through the support posts 24. Because it is intended to be load bearing, the support surface 22 may have the strength and rigidity necessary to bear the intended loads. In one embodiment, the support surface 22 may comprise, e.g., a sheet of ⅝-inch (16 mm) plywood. In other embodiments, the support surface 22 may be, e.g., sheet metal or a plastic slab. The material and thickness of the support surface 22 will depend, at least in part, on the anticipated loads.

The support posts 24 of this embodiment are secured to the support surface 22 in a regular pattern, in this case, a rectilinear grid. The support posts 24 may be solid or hollow, although in the view of FIG. 1, they are hollow cylinders and, as will be described below in more detail, are secured to the support surface 22 with screws or other such fasteners. The shape of the support posts 24 may vary from embodiment to embodiment; they may be, e.g., rectangular, square, or triangular prisms in other embodiments. However, it is possible that the cylindrical shape of the support posts 24 in the illustrated embodiment may help to avoid sharp edges that could act to concentrate light and create non-uniform illumination, as will be described below in more detail.

Figure 2:
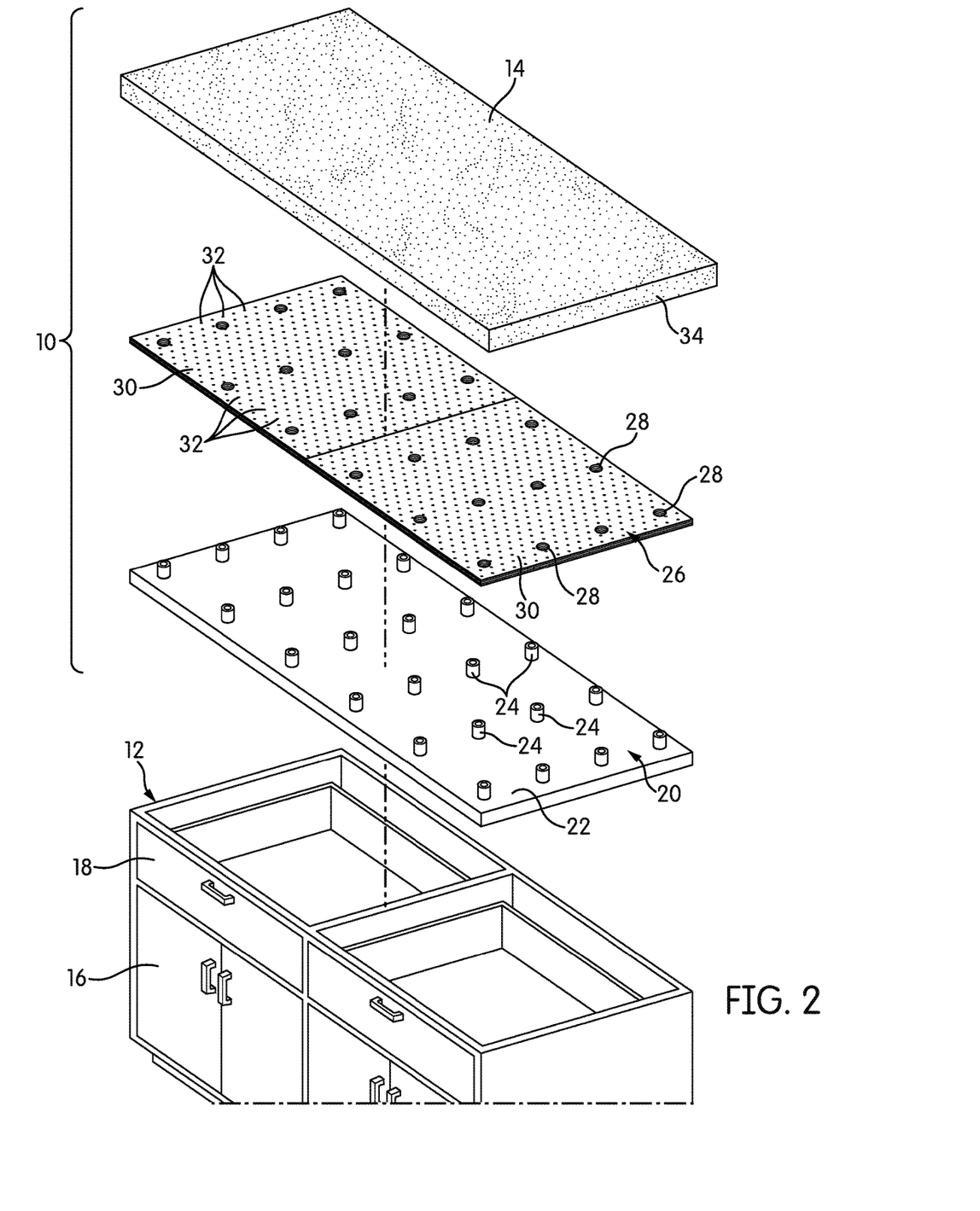
FIG. 2 is an exploded perspective view of the cabinet and under-counter lighting system of FIG. 1.

FIG. 2 is an exploded perspective view of the undercounter lighting system 10 and the cabinet 12. As shown in FIG. 2, in this embodiment, the base layer 20 includes a support surface 22 with twenty-four support posts 24, arrayed in a rectangular grid in six columns of four support posts 24.

An LGP layer 26 inserts over the base layer 20. Specifically, the LGP layer 26 has a number of openings 28 arrayed in the same pattern as the support posts 24 that allow the support posts 24 of the base layer 20 to protrude through the LGP layer 26. The support posts 24 may be about 1-2 inches (25-50 mm) in height, and in the illustrated embodiment, are 25 mm or 1 inch high.

In the illustrated embodiment, there are two individual LGPs 30 in the LGP layer 26. The LGP layer 26 may be comprised of any number of individual LGPs 30, so long as the individual LGPs 30 have openings 28 in the correct locations to pass over the support posts 24. The LGPs 30 of the LGP layer 26 typically have a surface pattern 32 of features that are essentially deliberate irregularities in the surface and, as such, allow light to escape evenly across the top surface of the LGPs 30. That surface pattern 32 may be cut, burned, abraded, or otherwise formed on the top surface of the LGPs 30.

As those of skill in the art may note, the openings 28 interrupt the LGPs 30, such that light may spill out of the LGPs 30 at the openings 28. Thus, in this embodiment, the support posts 24 are made of the same material as the waveguide layers of the LGPs 30, such as PMMA or polycarbonate. Thus, light can flow through the support posts 24 generally parallel to the surface of the LGPs 30. To prevent light leaks, the bottoms of the support posts 24 are preferably reflectively coated. For example, the bottoms of the support posts 24 may be painted white or covered with a reflective foil. Of course, the support posts 24 need not be made of the same material as the LGPs 30 in all embodiments, although it may be helpful if they are at least translucent and are made of a material that has a similar refractive index to that of light-guide layer of the LGPs 30.

Figure 3:
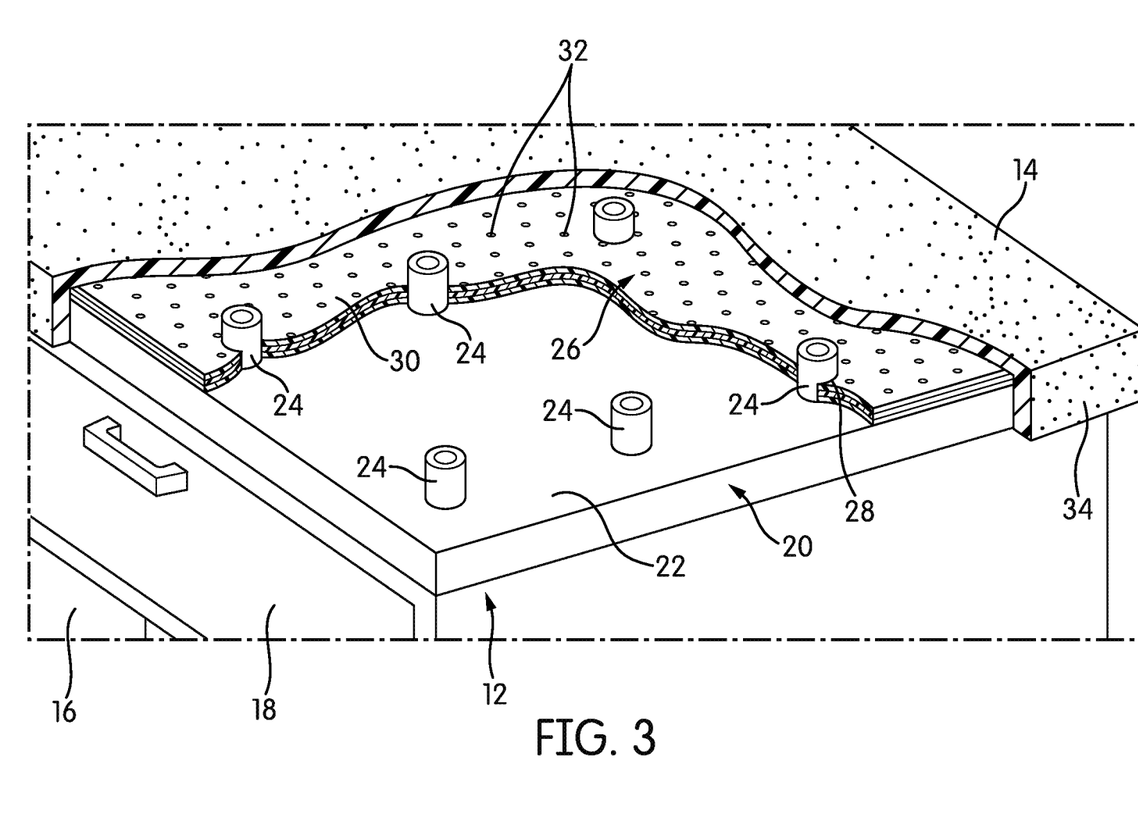
FIG. 3 is an enlarged, partially cut-away perspective view.
Figure 4:
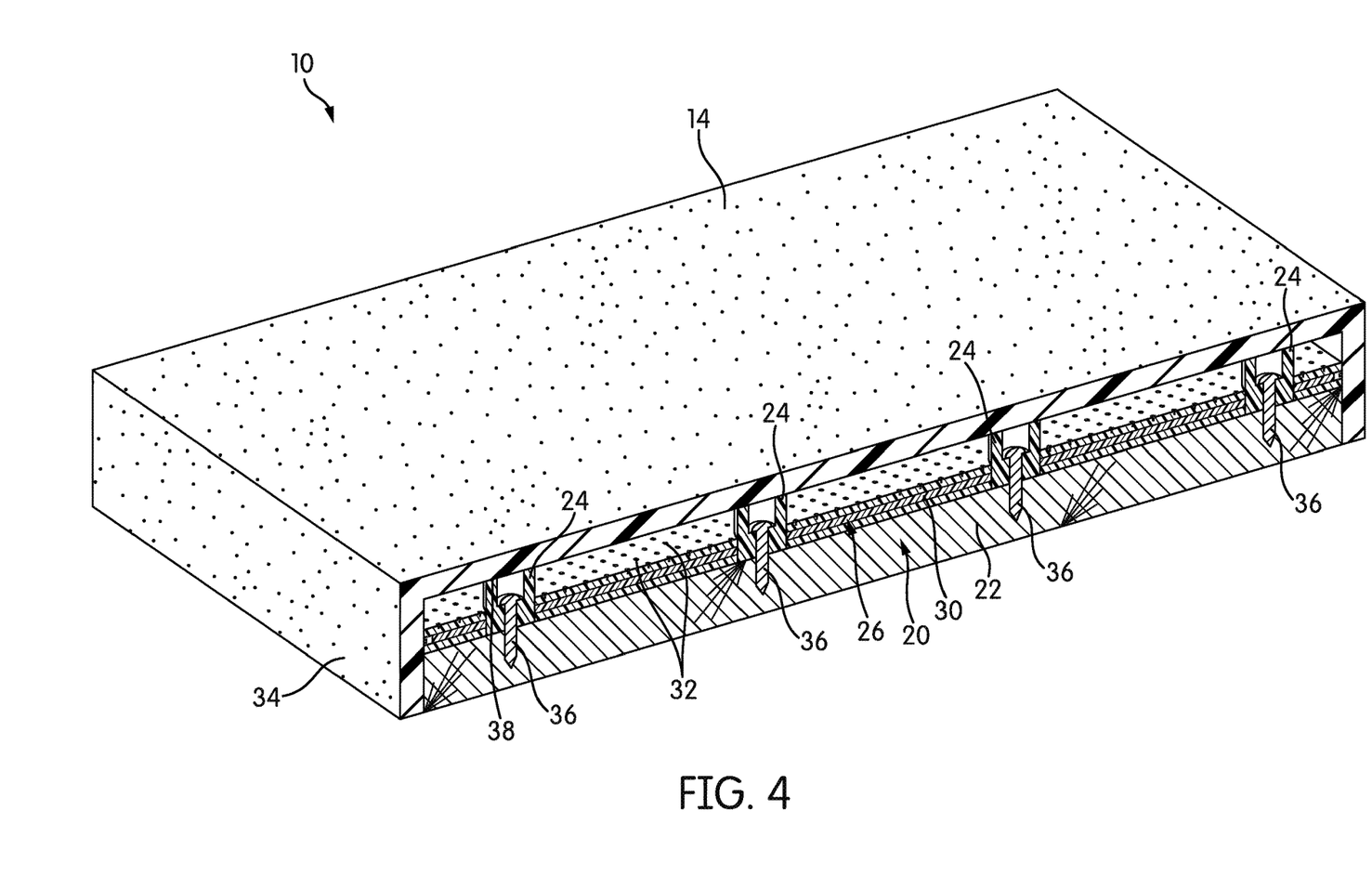
FIG. 4 is a partially cross-sectional perspective view taken through Line 4-4 of FIG. 1.

As is visible in FIGS. 1-3 and also in FIG. 4, a cross-sectional perspective view with the section taken through Line 4-4 of FIG. 1, the countertop 14 in this embodiment has a depending lip 34 of sufficient height to hide the LGP layer 26 and the base layer 20. The depending lip 34 or skirt may be, e.g., about 2-3 inches (50-75 mm) in height, depending on the thickness of the support layer 22, the heights of the support posts 24, etc.

FIG. 4 also shows additional details of the construction of system 10, including the fasteners 36 used to secure the support posts 24 to the support surface 22. Adhesive layers 38 at the interfaces between the support posts 24 and the underside of the countertop 14 would generally be used to secure the countertop 14 to the support posts 24. The adhesive used in the adhesive layers 38 may be of any type or have any underlying chemistry. It may be a one-part adhesive, a two-part adhesive, or a pressure-sensitive adhesive provided on each support post 24 with a protective or release layer that is removed to expose the adhesive. Various types of caulks, mastic adhesives, and other such elements commonly used in the assembly of cabinetry may also be used. In some cases, the installer may choose to fill each support post 24 with the adhesive, rather than relying only on a thin adhesive layer 38 at the interface. Whatever the adhesive, it is helpful if the adhesive is strong enough to secure the countertop 14 while still allowing the countertop 14 to be broken free if there is a need to service the LGP layer 26. While the details of installation may be adapted by the installer, using system 10, the countertop 14 can be secured relative to the LGP layer 26. Specifically, the base layer 20 is secured to the cabinet 12, and the countertop 14 is secured to the support posts 24 of the base layer 20.

Figure 5:
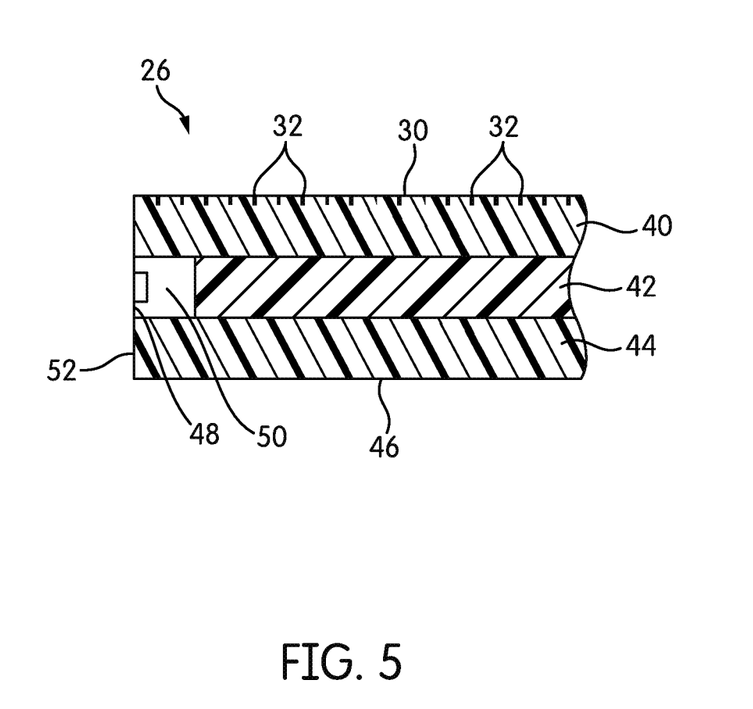
FIG. 5 is an enlarged, detailed cross-sectional view of a portion of the light-guide panel (LGP) in isolation, taken in the same plane as FIG. 4.

The features of the LGP layer 26 and LGP 30 are shown in more detail in FIG. 5, a cross-sectional view of a portion of the LGP 30 in isolation, taken in the same plane as the view of FIG. 4. As FIGS. 4 and 5 may make especially apparent, the LGPs 30 of the LGP layer 26 have substantial thickness. This is for a reason.

A typical LGP has a frame. This frame, which may be comprised of a reflective tape or of a metal extrusion, covers the edges of the typical LGP, wrapping around to cover at least a small portion of the front and back of the LGP. The frame conceals a strip or strips of linear lighting that emit light into the LGP and helps to ensure that light from the light-emitting elements enters the panel without light leaks.

While effective, a typical frame does block a small portion of the light-emitting surface of the LGP at its edge.

To avoid the potential disadvantage of blocking some of the light-emitting surface with a frame, LGPs 30 in the illustrated embodiment are frameless, i.e., the tape or other securement for the light-emitting elements does not cover the front or back of the LGP 30. To achieve that, the LGP 30 itself is thickened. Specifically, in this embodiment, the LGP 30 is constructed of three separate layers of panel material 40, 42, 44 stacked on top of one another. As was noted above, the panel material may be any material that can be formed into a flat panel and that has a higher refractive index than air. Suitable materials include PMMA; polycarbonate; polyurethane and other clear, rigid plastics; glass; and more exotic materials, such as sapphire. The remainder of this description will assume that each layer of panel material 40, 42, 44 is PMMA. In the illustrated embodiment, each layer of panel material 40, 42, 44 is 4 mm (0.16 in) thick. The bottom layer of material 44 has a reflective layer 46, which may, e.g., be a thin layer of white plastic material adhered with pressure-sensitive adhesive, although in other embodiments, materials like aluminized MYLAR® and metal foils may be used. No other layer of panel material 40, 42 has a reflective layer 46. By contrast, the top layer of panel material 40 has the surface pattern 32 that allows the LGP 30 to release light. No other layer of panel material 42, 44 has a surface pattern 32. Thus, the three layers of panel material 40, 42, 44 are configured to function as a single layer of panel material would. Variations on this are possible. For example, the second or middle layer of panel material 42 could include a reflective layer 46, instead of the bottom layer of material 44.

The stacked layers of material 40, 42, 44 provide room for a strip or strips of linear lighting 48 to be placed without the need for a frame. Specifically, the central layer 42 is shorter than the other layers of material 40, 44 by, e.g., 3-5 mm along at least one side. The difference in dimensions leaves a small cavity 50, in which the strip of linear lighting 48 can be placed. A strip of reflective tape 52, e.g., white or metallic-foil tape, secures the linear lighting 48 in place. The side of the LGP 30 is thick enough so that the tape 52 can extend around the edge to secure the strip of linear lighting 48 without folding over onto the front and rear sides.

The tape 52 provides some securement for the three layers of panel material 40, 42, 44, as does the common engagement of all three layers of panel material 40, 42, 44 with the support posts 24. However, small screws may be inserted through the thickness of the three layers 40, 42, 44 to secure them together, if necessary or desirable. Each LGP 30 in the LGP layer 26 usually has its own set of wires or a cable for power and data signals, which are not shown in the figures. These wires or cables may exit, e.g., from the corners of the LGPs 30.

In system 10 of FIGS. 1-5, the diffuse light provided by the LGPs 30 is assumed to be sufficient to backlight the countertop 14. However, in some embodiments, more concentrated light may be desirable in at least some areas of the LGP layer 26. If more concentrated light is desirable, the LGP layer 26 described above may be coupled with light-emitting elements that emit light directly at the underside of the countertop 14.

Figure 6:
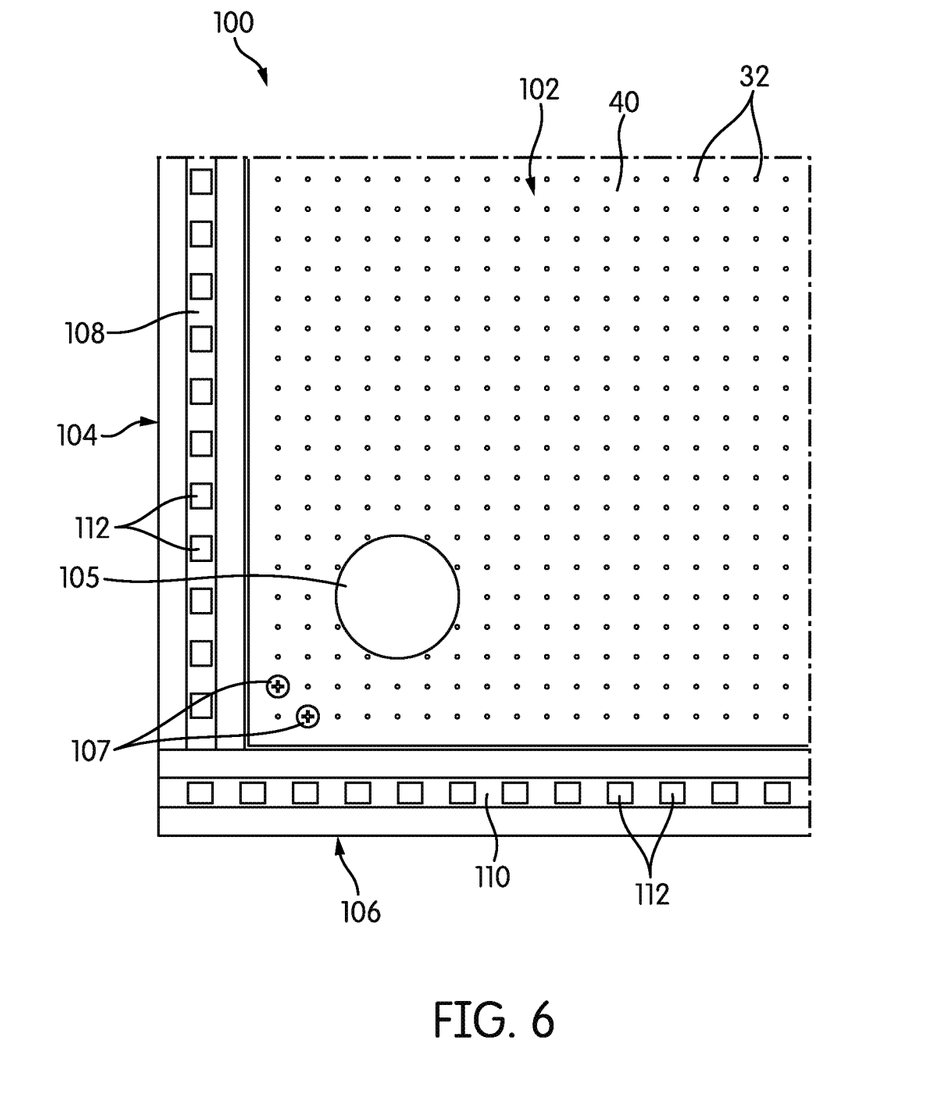
FIG. 6 is a top plan view of a portion of an LGP layer according to another embodiment of the invention, illustrating upwardly-emitting borders.

FIG. 6 is a top plan view of a portion of an LGP layer 100 according to another embodiment of the invention. The LGP layer 100 includes the main LGP or LGPs 102. The portion of the main LGP 102 that is shown has one opening 105 to receive a support post 24, and would generally have the same sort of pattern of openings 105 that is described above. The LGP 102 also has the same type of 3-layer structure shown in FIG. 5. As shown, small machine screws 107 can be used to hold the three layers of panel material 40, 42, 44 together. As was described above, the top layer of panel material 40 has a surface pattern 32 to release light, and the bottom layer of panel material 44 has a reflective layer 46.

The main LGP 102 has a border comprised of individual sections 104, 106. Each border section 104, 106 includes a strip of linear lighting 108 with LED light engines 112 placed along the strip at a regular spacing or pitch. The border sections 104, 106 are constructed and oriented such that light is emitted upward, directly into the countertop 14 when the countertop 14 is installed. That is, whereas an LGP emits diffused light indirectly, usually in a direction perpendicular to the direction in which the light was originally emitted, in the border sections 104, 106, the upper edge through which light exits is parallel with the direction in which the light is emitted. Light is emitted straight up.

As those of skill in the art will appreciate, any element that is attachable to the main LGP or LGPs 102 and can support a strip of linear lighting 108, 110 oriented so that the LED light engines 112 emit light upward, parallel with a thickness of the main LGP or LGPs 102, can be used as a border to the LGPs 102 in embodiments of the invention. However, in this embodiment, the border sections 104, 106 have the same three-layer structure that is used in the LGPs 30, 102.

More specifically, each of the border sections 104, 106 has the same basic cross-sectional features as shown in FIG. 5, with the strip of linear lighting 108 placed in a small cavity created by a difference in the dimensions of the center layer of panel material 42 relative to the other two layers 40, 44. However, the border sections 104, 106 are stubby, with a limited height. In some cases, the height of the border sections 104, 106 may be equal, or about equal, to the thickness of the main LGP or LGPs 102, e.g., about 12-15 mm (about 0.5 inches).

Figure 7:
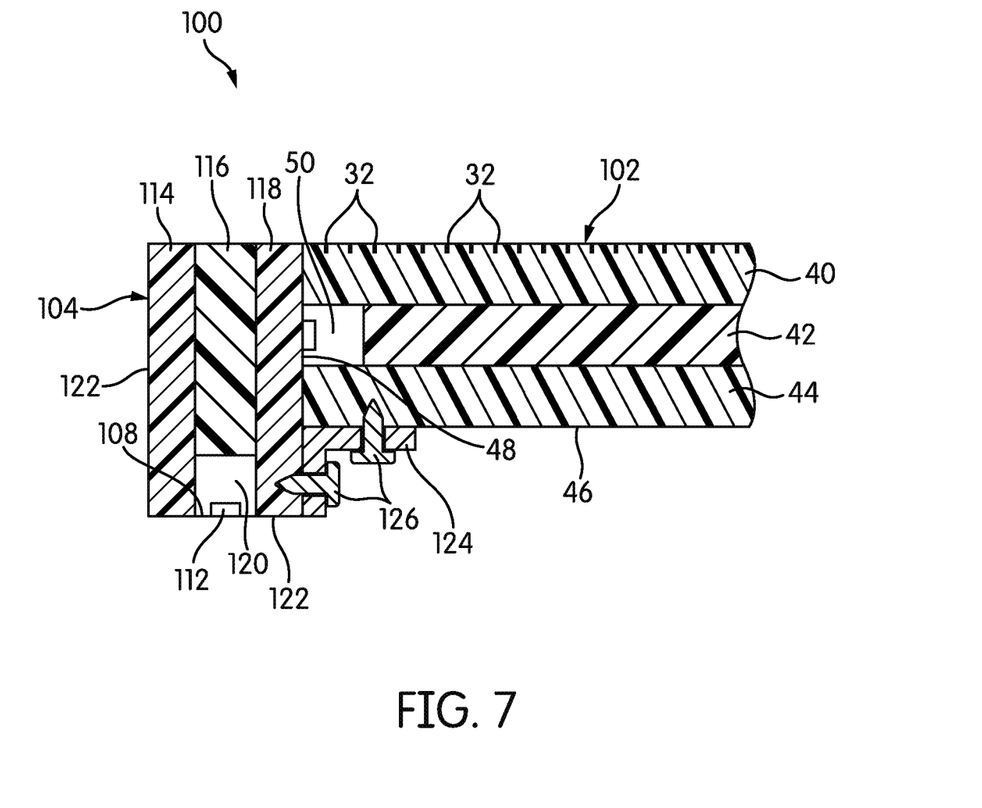
FIG. 7 is a cross-sectional view of the LGP layer of FIG. 6.

In some cases, the border sections 104, 106 that serve as borders may be taller than the thickness of the main LGP or LGPs 102. FIG. 7 is a side cross-sectional view of the LGP layer 100 of FIG. 6. The three layers of material 114, 116, 118 of the border section 104 are shown in the view of FIG. 7, as is the small cavity 120 created by the smaller dimensions of the center layer of material 116 of the border section 104. The sides and bottom of the border section 104 may be covered by reflective or light-absorbing layers 122. The top of the border section 104 may have a light-releasing pattern in some embodiments, although such a thing may not be necessary, and is not provided in the illustrated embodiment, because light exits in the direction in which it is emitted in the border sections 104, 106.

As shown in FIG. 7, the border section 104 has a greater height than the thickness of the main LGP 102. Thus, the border section 104 extends below the main LGP 102, in some cases serving as a support for the main LGP 102. The main LGP 102 and the border section 104 are secured together by brackets, such as L-brackets 124, with screws 126 or other fasteners inserted into the main LGP 102 and the border section 104 to secure the L-brackets 124.

Although the three-layer structure of the border sections 104, 106 is not critical, the presence of the three layers 114, 116, 118 and the structure of the cavity 120 may help to constrain or direct the light emitted by the LED light engines 112 on the strip of linear lighting 108. The layers 114, 116, 118 may also diffuse the light somewhat. In some embodiments, a diffusing additive, such as a colorant or a particulate additive, may be added to one or more of the layers 114, 116,

118 to further diffuse the light. For example, titanium dioxide microspheres may be added to create diffusion. Additionally, filters or dampeners may be added to the top surface of the border sections 104, 106 in order to control the intensity or character of the light that is transmitted through the border sections 104, 106.

The border sections 104, 106 border the entire LGP layer 100. If multiple LGPs 102 comprise the LGP layer 100, each LGP 102 would usually not be fully bordered by border sections 104, 106. For example, if two LGPs 102 are placed adjacent to one another to constitute the LGP layer 100, the border sections 104, 106 are placed bordering three of the four sides of each of the two LGPs 102, leaving the remaining side of each LGP 102 unbordered so that the two LGPs 102 can be laid next to one another with no interruption. However, if a strip of directed upward light is desired in the middle of the countertop 14, the individual LGPs 102 may be bordered on all sides by border sections 104, 106.

The type of light emitted by an LGP layer 26, 100 is not particularly limited. The emitted light may be so-called "white" light of any color temperature, or it may be colored light. A strip of linear lighting 48, 108, when used as a light source for LGPs 30, 102, may include light engines that emit a single color of light, or it may include light engines that emit multiple colors of light. For example, an LGP 30, 102 may be capable of emitting light of either of two color temperatures, e.g., one relatively "cool" color temperature (e.g., 5000K) and one relatively "warm" color temperature (e.g., 2700K). In practice, the LGP 30, 102 may be controlled to emit the cool light, the warm light, or a mixture of both.

The individual LGPs 30, 102 that comprise the LGP layer 26, 100 would often be controlled together so as to emit the same type, character, and luminous flux of light at the same time, such that the entire countertop 14 is backlit in the same way. However, there is no requirement that this be the case. One LGP 30, 102 in an LGP layer 26, 100 could be controlled separately from the others such that, e.g., one section of the countertop 14 is backlit with one color of light, while another section of the countertop 14 is backlit with another color of light.

Various methods of controlling light emission may be used in different embodiments of the invention. At the simplest, controlling a system according to an embodiment of the invention may mean connecting it to power. If a system emits a single color of light (including "white" light), the most common variable-control method may involve connecting system 10 to a dimmer. However, more complex methods of control may also be used. For example, a system like system 10 may be connected to an interface that allows it to be controlled using a more complex protocol, like DMX or DALI. The precise nature of the control system will depend on the exact nature of the light-emitting elements 112 in the LGPs 30, 102 (i.e., single-color, two-color, RGB, etc.) as well as the needs of the particular installation.

As those of skill in the art will note from the above description, the use of a system such as system 10 may raise the height of the countertop 14, when finally installed, about 1-2 inches (about 25-50 mm) above the height of a comparable countertop without a lighting system. In some jurisdictions, the heights of countertops may be set or regulated for accessibility or other reasons. If the additional height of a countertop 14 that uses system 10 poses an obstacle, the cabinet 12 or other support can often be shortened at the bottom to compensate.

Portions of this disclosure use the term "about." That term, when used in association with a numerical value or range, means that the stated value or range may vary, so long as the variation does not alter the described function or result. If it cannot be ascertained what level of variation would not alter the described function or result, the term "about" should be read to mean±5%.

While the invention has been described with respect to certain embodiments, the description is intended to be exemplary, rather than limiting. Modifications and changes may be made within the scope of the invention, which is defined by the appended claims.

What is claimed is:

1. A system, comprising:
   a base layer including a support layer and a number of support posts attached to and extending upwardly from the support layer, the support posts spaced from one another on the support layer; and
   a light-guide panel (LGP) layer including one or more LGPs, each of the one or more LGPs having openings through a thickness thereof in order to receive the support posts of the base layer through the openings, and each of the one or more LGPs including an inset groove along at least one side and a strip of linear lighting positioned in the inset groove.

2. The system of claim 1, further comprising a countertop adapted to be secured to tops of the support posts such that the LGP layer is interposed between the base layer and the countertop, the countertop being at least partially translucent.

3. The system of claim 2, wherein the countertop has a depending lip of sufficient dimension to at least partially hide the base layer and the LGP layer.

4. The system of claim 2, wherein the support posts are made of a light-transmissive material that is at least similar to a material of which the one or more LGPs are made.

5. The system of claim 4, wherein the support posts are hollow cylinders.

6. The system of claim 2, wherein bottoms of the support posts have a reflective coating.

7. The system of claim 2, wherein the LGP layer further comprises a border, the border including a light-emitting element or elements that emit light directly upward, toward the countertop.

8. The system of claim 1, wherein each of the one or more LGPs is absent frame structure on at least the upper surface thereof.

9. The system of claim 1, wherein each of the one or more LGPs is constructed of two or more layers of light-guide material, with one of the two or more layers having at least one different dimension from others of the two or more layers so as to create the inset groove.

10. The system of claim 9, wherein a bottom layer of the two or more layers of light-guide material has a reflective layer along a bottom surface thereof.

11. The system of claim 10, wherein a top layer of the two or more layers of light-guide material has a light-releasing surface pattern.

12. A system, comprising:
    a cabinet; and
    a countertop lighting system secured to the cabinet, the countertop lighting system including
    a base layer including a support layer and a number of support posts attached to and extending upwardly from the support layer, the support posts spaced from one another on the support layer,
    a light-guide panel (LGP) layer including one or more LGPs, each of the one or more LGPs having openings through a thickness thereof in order to receive the support posts of the base layer through the openings; and a countertop adapted to be secured to tops of the support posts such that the LGP layer is interposed between the base layer and the countertop, the countertop being at least partially translucent.

13. The system of claim 12, wherein the countertop has a depending lip of sufficient dimension to at least partially hide the base layer and the LGP layer.

14. The system of claim 12, wherein the support posts are made of a light-transmissive material that is at least similar to a material of which the one or more LGPs are made.

15. The system of claim 14, wherein the support posts are hollow cylinders.

16. The system of claim 14, wherein bottoms of the support posts have a reflective coating.

17. The system of claim 12, wherein each of the one or more LGPs includes an inset groove along at least one side, and a strip of linear lighting positioned in the inset groove.

18. The system of claim 17, wherein each of the one or more LGPs is constructed of two or more layers of light-guide material, with one of the two or more layers having at least one different dimension from others of the two or more layers so as to create the inset groove.

19. A system, comprising:
a base layer including a support layer and a number of support posts attached to and extending upwardly from the support layer, the support posts spaced from one another on the support layer, bottoms of the support posts having a reflective coating; and a light-guide panel (LGP) layer including one or more LGPs, each of the one or more LGPs having openings through a thickness thereof in order to receive the support posts of the base layer through the openings;

wherein the support posts are made of a light-transmissive material that is at least similar to a material of which the one more LGPs are made.

20. The system of claim 19, wherein the support posts are hollow cylinders.

* * * * *